(12) United States Patent
Baker et al.

(10) Patent No.: US 7,043,544 B2
(45) Date of Patent: May 9, 2006

(54) PROCESSOR WITH MULTIPLE-PASS NON-SEQUENTIAL PACKET CLASSIFICATION FEATURE

(75) Inventors: William E. Baker, Austin, TX (US); Mauricio Calle, Austin, TX (US); James T. Kirk, Austin, TX (US); Betty A. McDaniel, Austin, TX (US)

(73) Assignee: Agere Systems Inc., Allentown, PA (US)

( * ) Notice: Subject to any disclaimer, the term of this patent is extended or adjusted under 35 U.S.C. 154(b) by 872 days.

(21) Appl. No.: 10/029,703

(22) Filed: Dec. 21, 2001

(65) Prior Publication Data

US 2003/0120790 A1  Jun. 26, 2003

(51) Int. Cl.
*G06F 15/16* (2006.01)

(52) U.S. Cl. .................................. 709/223; 709/245

(58) Field of Classification Search ............... 709/245, 709/238; 370/395.52, 395.43, 392, 389, 370/230, 235

See application file for complete search history.

(56) References Cited

U.S. PATENT DOCUMENTS

| | | | | |
|---|---|---|---|---|
| 6,157,955 A * | 12/2000 | Narad et al. | ............. | 709/228 |
| 6,381,242 B1 * | 4/2002 | Maher et al. | ............. | 370/394 |
| 6,587,463 B1 * | 7/2003 | Hebb et al. | ............. | 370/392 |
| 6,775,284 B1 * | 8/2004 | Calvignac et al. | ............. | 370/392 |
| 6,907,468 B1 * | 6/2005 | Moberg et al. | ............. | 709/236 |

OTHER PUBLICATIONS

Wirbel, Loring; "Packet Classifier Race Heats Up"; Mar. 6, 2000; Electronic Engineering Times; p. 53.*
Borg, N.; "Efficient Multi-Field Packet Classification for QoS Purposes"; 1999; Seventh International Workshop on Quality of Service; IWQoS '99; p. 109-118.*
Ji et al., "Fast IP Packet Classification with Configurable Processor".*
Iyer et al., "ClassiPI: An Architecture for Fast and Flexible Packet Classification", Mar. 2001.*

* cited by examiner

*Primary Examiner*—William C. Vaughn, Jr.

(57) ABSTRACT

A network processor or other type of processor includes classification circuitry and memory circuitry coupled to the classification circuitry. The memory circuitry is configured to store at least a portion of at least a given one of a number of packets to be processed by the classification circuitry. The classification circuitry implements a non-sequential packet classification process for at least a subset of the packets including the given packet. For example, in an embodiment in which the given packet is generated in accordance with multiple embedded protocols, the non-sequential packet classification process allows the processor to return from a given point within the packet, at which a final one of the protocols is identified, to a beginning of the packet, through the use of a "skip to beginning" instruction. The skip to beginning instruction may be configured to allow the processor to skip back to a particular bit, e.g., a first bit, of the given packet at a time during the classification process after which the particular bit has been processed, such that multiple passes of the classification process can be performed on the given packet. The processor may be configured as a network processor integrated circuit to provide an interface between a network from which the packet is received and a switch fabric in a router or switch.

18 Claims, 3 Drawing Sheets

PROCESSOR WITH MULTIPLE-PASS NON-SEQUENTIAL PACKET CLASSIFICATION FEATURE

FIELD OF THE INVENTION

The present invention relates generally to packet processing systems, and more particularly to a network processor or other type of processor configured for use in performing packet routing, packet switching and other packet processing operations within such a system.

BACKGROUND OF THE INVENTION

A network processor generally controls the flow of packets between a physical transmission medium, such as a physical layer portion of, e.g., an asynchronous transfer mode (ATM) network or synchronous optical network (SONET), and a switch fabric in a router or other type of packet switch. Such routers and switches generally include multiple network processors, e.g., arranged in the form of an array of line or port cards with one or more of the processors associated with each of the cards.

Many conventional routers and switches are configured to store, for a given packet being processed, substantially the entire packet, until that packet is finally transmitted to its destination or dropped. The packet is usually stored in a router or switch memory external to the associated network processor. The amount of time the given packet may be kept in external memory is influenced by the basic processing time of the router or switch, the quality of service applied to the packet, the particular protocol layers to be analyzed, and the congestion of the port or other communication channel to which the packet is directed.

High-speed routers and switches will typically store in on-chip memory within the network processor some portion of a given packet being processed by that network processor. This greatly enhances the performance of the router or switch by not requiring it to access the larger external memory holding the entire packet, in that the external memory is slower and more band-limited than the on-chip memory.

A network processor generally must perform packet classification operations in order to determine the particular processing operations to be applied to a given packet. Such classification is preferably performed on the portions of the packets stored in the on-chip or internal memory of the processor.

In accordance with conventional practice, the above-noted packet classification is performed in a linear or sequential manner. That is, the bits of the packet are processed sequentially, starting from the beginning of the packet, until a sufficient number of bits have been processed to allow a classification decision to be made. Unfortunately, this type of sequential classification is generally unsuitable for use with embedded protocols.

For example, consider a packet with three embedded protocols in which determination of the third protocol requires that a parity check of the entire packet be performed, including the bits that have already been processed. This type of situation creates a problem in that the sequential classification process must return to the beginning of the packet and be re-started in a manner which will satisfy the third protocol. As a result, the throughput of the processor may be significantly reduced.

As is apparent from the foregoing, a need exists for techniques for performing packet classification in a network processor or other type of processor, so as to accommodate the embedded protocols situation described above as well as other situations in which conventional sequential classification is deficient.

SUMMARY OF THE INVENTION

The invention provides non-sequential packet classification techniques for use in a network processor or other type of processor.

In accordance with one aspect of the invention, a network processor or other type of processor includes classification circuitry and memory circuitry coupled to the classification circuitry. The memory circuitry is configured to store at least a portion of at least a given one of a number of packets to be processed by the classification circuitry. The classification circuitry implements a non-sequential packet classification process for at least a subset of the packets including the given packet. For example, in an embodiment in which the given packet is generated in accordance with multiple embedded protocols, the non-sequential packet classification process allows the processor to return from a given point within the packet, at which a final one of the protocols is identified, to a beginning of the packet, through the use of a "skip to beginning" instruction. The given point within the packet may be, e.g., a point at which a Transmission Control Protocol (TCP) destination is identified for the packet.

In accordance with another aspect of the invention, the skip to beginning instruction may be configured to allow the processor to skip back to a particular bit, e.g., a first bit, of the given packet at a time during the classification process after which the particular bit has been processed, such that multiple passes of the classification process can be performed on the given packet.

In accordance with a further aspect of the invention, the classification circuitry may include at least a first pass classifier and a second pass classifier, with the non-sequential packet classification process being implemented in at least the second pass classifier.

A processor in accordance with the invention may be configured as a network processor integrated circuit to provide an interface between a network from which the packet is received and a switch fabric in a router or switch.

Advantageously, the techniques of the invention can easily handle packets configured with multiple embedded protocols, thereby reducing the number of dropped packets and increasing processor throughput.

DETAILED DESCRIPTION OF THE INVENTION

Figure 1:
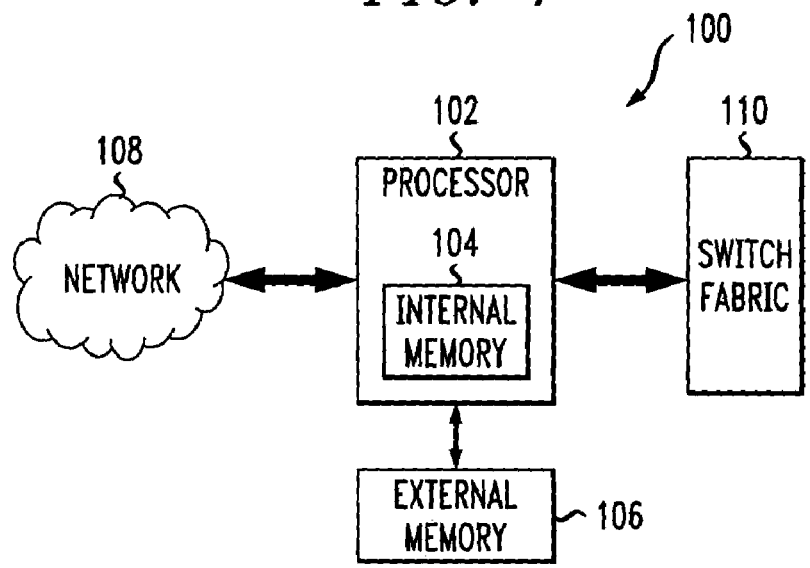
FIG. 1 is a simplified block diagram of a packet processing system in which the present invention is implemented.

The invention will be illustrated herein in conjunction with an exemplary packet processing system which includes a network processor configured in a particular manner. It should be understood, however, that the invention is more generally applicable to any processor in which it is desirable to provide non-sequential packet classification which overcomes one or more of the above-noted deficiencies of conventional sequential packet classification.

A "processor" as the term is used herein may be implemented, by way of example and without limitation, utilizing a microprocessor, central processing unit (CPU), digital signal processor (DSP), application-specific integrated circuit (ASIC), or other type of data processing device, as well as portions and combinations of these and other devices.

The term "classification circuitry" as used herein is intended to include any portion of a processor or other type of processing circuitry which is capable of performing at least a portion of at least one classification operation on a packet or a portion of a packet. Examples of classification operations include, without limitation, preclassification, reassembly, prioritization, statistics gathering, scheduling, traffic management, etc. As a more particular example, an illustrative embodiment of the invention to be described below includes first classification circuitry configured to perform a first pass classification and second classification circuitry configured to perform a second pass classification. The first pass classification in this embodiment generally includes at least a portion of a packet reassembly operation, and the second pass classification in this embodiment generally includes at least a portion of a scheduling or traffic management operation. The first and second classification circuitry may each represent, e.g., one or more separate classification engines, different portions of a single classification engine, or other arrangements of circuitry configured to provide at least a portion of the processing operations described herein. As another example, to be described in conjunction with FIG. 5 below, the first pass classification can be configured to prioritize packets in accordance with a desired prioritization for scheduling of second pass classification.

The present invention in an illustrative embodiment improves processor throughput in a packet processing system through the use of a non-sequential packet classification process. The non-sequential packet classification process provides a "skip to beginning" instruction that allows the processor to skip back to the first bit of a given packet at any time during the classification process, such that any desired number n of passes of the classification process can be performed on the given packet. In the illustrative embodiments, the non-sequential packet classification process is implementable in at least the second pass classifier of a network processor comprising first pass and second pass classifiers.

FIG. 1 shows a packet processing system 100 in which the invention is implemented. The system 100 includes a network processor 102 having an internal memory 104. The network processor 102 is coupled to an external memory 106 as shown, and is configured to provide an interface between a network 108 from which cells, packets or other packet data are received and a switch fabric 110 which controls switching of packet data. The processor 102 and its associated external memory 106 may be implemented, e.g., as one or more integrated circuits installed on a line card or port card of a router or switch. In such a configuration, the switch fabric 110 is generally considered to be a part of the router or switch.

It should be understood that the particular arrangement of system elements shown in FIG. 1 is by way of illustrative example only. More particularly, as previously noted, the invention can be implemented in any type of packet processor, and is not limited to any particular packet processing application.

Figure 2:
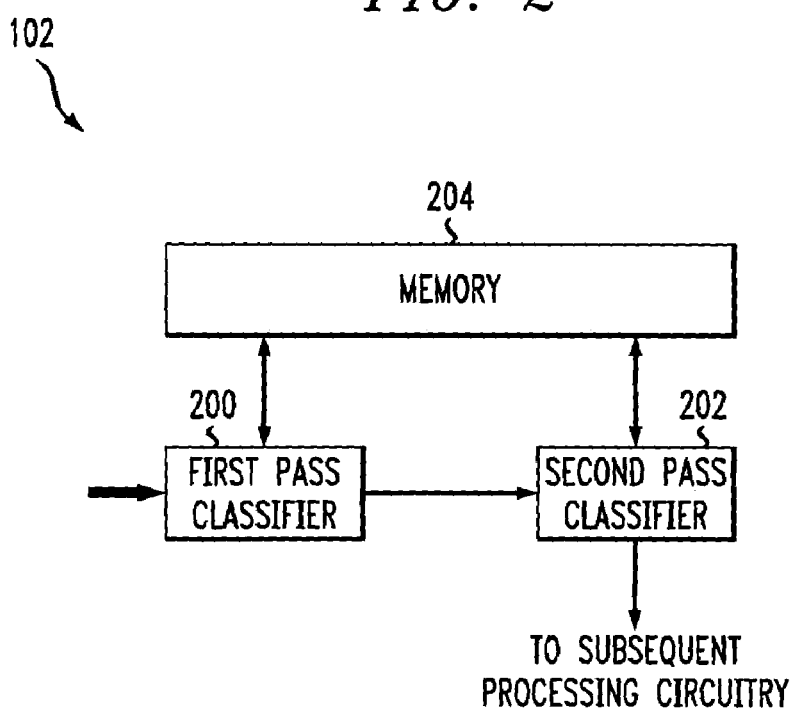
FIG. 2 is a more detailed view of a network processor of the FIG. 1 system configured in accordance with the techniques of the invention.

FIG. 2 shows the network processor 102 of FIG. 1 in greater detail. The network processor 102 in this embodiment includes a first pass classifier 200 which receives incoming packet data from the network 108 or the switch fabric 110. The first pass classifier 200 is coupled to a memory 204 and a second pass classifier 202. The memory 204 may comprise at least a portion of the internal memory 104, the external memory 106, or both. Second pass classifier 202 is also coupled to the memory 204. An output of the second pass classifier 202 goes to subsequent processing circuitry which may include, e.g., scheduling circuitry, queuing circuitry, dispatch circuitry, etc.

The first pass classifier 200 of FIG. 2 may be implemented as a preclassifier which performs at least one of a reassembly operation, a parity check and a priority determination for a given packet, while the second pass classifier 202 is implemented as one or more classification engines which perform at least one of a scheduling operation, a queuing operation and a dispatch operation. It is also possible that one or both of the classifiers 200, 202 may implement statistics gathering operations for use in scheduling and other traffic management functions. These and other operations of the classifiers 200, 202 may be implemented in a conventional manner using techniques well-known in the art, and are therefore not described in detail herein.

The packet data received by first pass classifier 200 may comprise cells or other portions of the given packet that are to be reassembled to form the given packet using reassembly circuitry that may be incorporated into or otherwise associated with the first pass classifier 200. The term "packet" as used herein is therefore intended to include not only a reassembled packet but also one or more cells or other packet data which when reassembled will form a packet.

Also, as indicated previously, different portions of the memory 204 may be implemented as separate memories, e.g., as portions of both the internal memory 104 and external memory 106 of FIG. 1, rather than as a single memory as shown in FIG. 2. The term "memory circuitry" as used herein is intended to include a separate memory as well as a particular portion of a larger memory, and may refer to internal memory, external memory or combinations thereof.

It is to be understood that the network processor 102 as shown in FIG. 2 is simplified for purposes of illustration, and in a given embodiment may include additional circuitry, such as the scheduling circuitry, dispatch circuitry and queuing circuitry noted above, one or more memory controllers, as well as appropriate interface circuitry for interfacing with the network 108, the switch fabric 110, and other external devices, such as an associated host processor.

As noted above, the present invention provides a non-sequential packet classification process including a "skip to beginning" instruction that allows the network processor 102 to skip back to the first bit of a given packet at any time during the classification process, such that any desired number n of passes of the classification process can be performed on the given packet. This non-sequential packet classification process is preferably implementable in at least the second pass classifier 202 of FIG. 2, but may be implemented in both the first pass classifier 200 and the second pass classifier 202. The operation of the non-sequential packet classification process will be illustrated in greater detail with reference to FIGS. 3A and 3B below.

Figure 3A:
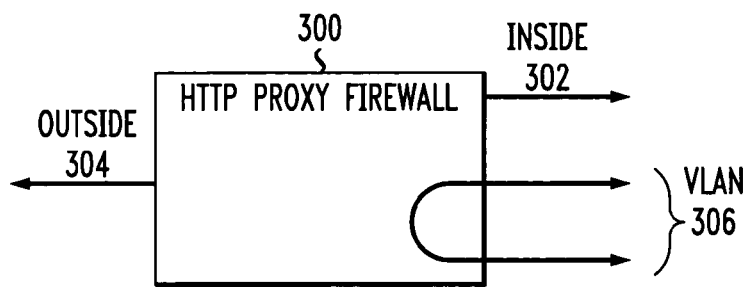
FIGS. 3A and 3B illustrate a non-sequential packet classification process that is implementable in the FIG. 1 system by the FIG. 2 network processor in accordance with the invention.
Figure 3B:
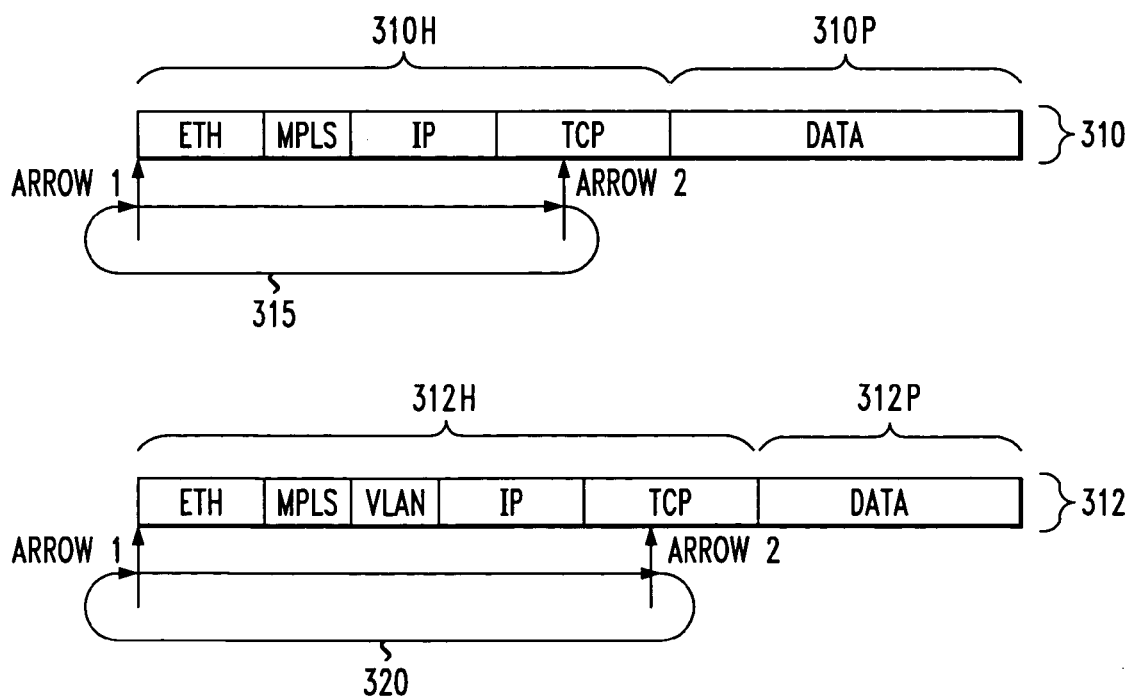

FIGS. 3A and 3B illustrate the non-sequential classification of packets configured in accordance with multiple embedded protocols, utilizing the techniques of the invention. In this particular example, the network processor 102 receives packet data from an element 300 of the network 108. The element 300 comprises a conventional HTTP proxy firewall which includes an inside port 302, an outside port 304, and a number of virtual local area network (VLAN) ports 306, as illustrated in FIG. 3A. As a result of this configuration, some packets received in the network processor 102 from the HTTP proxy firewall element 300 will contain a VLAN header, while other packets from element 300 will not.

FIG. 3B shows a received packet 310 which does not include a VLAN header, and another received packet 312 which does includes a VLAN header. More particularly, the packets 310, 312 include respective header portions 310H, 312H and respective payload portions 310P, 312P. The header portion 310H includes an Ethernet header (ETH), a Multiprotocol Label Switching header (MPLS), an Internet protocol header (IP) and a Transmission Control Protocol header (TCP), with no VLAN header. The header portion 312H includes the ETH, MPLS, VLAN, IP and TCP headers. The packet payloads 310P and 312P are each denoted as DATA. The packets 310, 312 are examples of packets configured in accordance with multiple embedded protocols. As described previously, conventional sequential packet classification processes have difficulty with such packets.

As indicated previously, the non-sequential packet classification process of the present invention allows the network processor 102 to return from a given point within a packet such as packet 310 or 312 at which a final one of the protocols is identified to a beginning of the packet. More particularly, in this illustrative embodiment, the non-sequential packet classification process comprises execution of at least one "skip to beginning" instruction that allows the processor to skip back to a first bit of the given packet at a time during the classification process after which the first bit has been processed, such that one or more passes of the classification process can be performed on the given packet.

With reference to FIG. 3B, the classification performed by second pass classifier 202 will begin for each of the packets 310 and 312 at the arrow denoted Arrow 1. The TCP header can be reached quickly, and will generally specify a TCP destination for the corresponding packet. The TCP destination is identified for each packet at point indicated by Arrow 2. The second pass classifier 202 of FIG. 2 may then direct packet 310 or 312 based on its TCP destination. For example, for TCP destinations of 80, corresponding to HTTP, the classifier 202 may direct the transmission of the packet with no further classification needed. However, it is possible that the TCP destination may not be 80, in which case additional classification will be needed. More particularly, the classifier 202 will need to return back to the beginning of the packet in order to apply additional classification rules to determine how the packet should be directed. This can be a variable amount of bits, since there are multiple protocol stacks involved in the present example. In other words, the distance from the point in packet 310 at which the TCP destination is determined is different from that in packet 312.

In accordance with the invention, the further classification required for packets 310 and 312 is implemented by execution in the network processor 102 of a "skip to beginning" instruction which in this embodiment directs the second pass classifier 202 to return to the beginning of the packet, as illustrated generally by 315 and 320 for respective packets 310 and 312. The additional classification passes required for proper processing of the packets can then be implemented in an efficient manner.

Although only a single return to beginning 315, 320 is shown for the packets 310, 312, it is possible to provide multiple such returns, as required in a given application.

Advantageously, the present invention through the use of the above-described "skip to beginning" instruction provides a non-sequential packet classification process that can efficiently handle packets having multiple embedded protocols, without loss of any portion of the packet. This significantly reduces the number of dropped packets and increases processor throughput.

The "skip to beginning" instruction of the non-sequential packet classification process, or the configuration of the network processor to handle such an instruction, may be implemented at least in part under control of a host processor or other host device operatively coupled to the network processor 102, e.g., via a peripheral component interconnect (PCI) bus. Advantageously, this allows a programmer to specify particular packet classification operations to be performed in the network processor 102.

It is to be appreciated that the "skip to beginning" instruction utilized in the illustrative embodiment described above is merely one example of an instruction associated with a nonsequential classification process in accordance with the invention. For example, in other embodiments, other instructions configured in a manner similar to that described above may be used to skip back to particular points within the packet, rather than back to the beginning of the packet. In addition, a similar non-sequential classification functionality can be provided through the use of multiple instructions, rather than a single "skip to beginning" instruction as in the illustrative embodiment.

Figure 4:
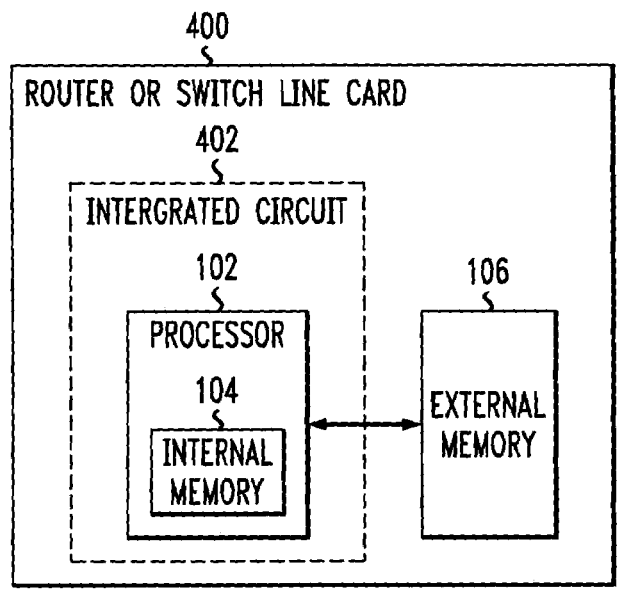
FIG. 4 illustrates one possible implementation of the FIG. 2 network processor as an integrated circuit installed on a line card of a router or switch.

FIG. 4 illustrates an example router or switch line card embodiment of a portion of the system 100 of FIG. 1. In this embodiment, the processing system comprises a line card 400 having at least one integrated circuit 402 installed thereon. The integrated circuit 402 comprises network processor 102 which has internal memory 104. The network processor 102 interacts with external memory 106 on the line card 400. The external memory 106 may serve, e.g., as an external tree memory for the network processor integrated circuit. The above-noted host processor may also be installed on the line card 400. The portion of the processing system as shown in FIG. 4 is considerably simplified for clarity of illustration. It is to be appreciated, however, that the processing system may comprise a router or switch which includes multiple such line cards, and that each of the line cards may include multiple integrated circuits. A similar embodiment may be implemented in the form of a port card.

Figure 5:
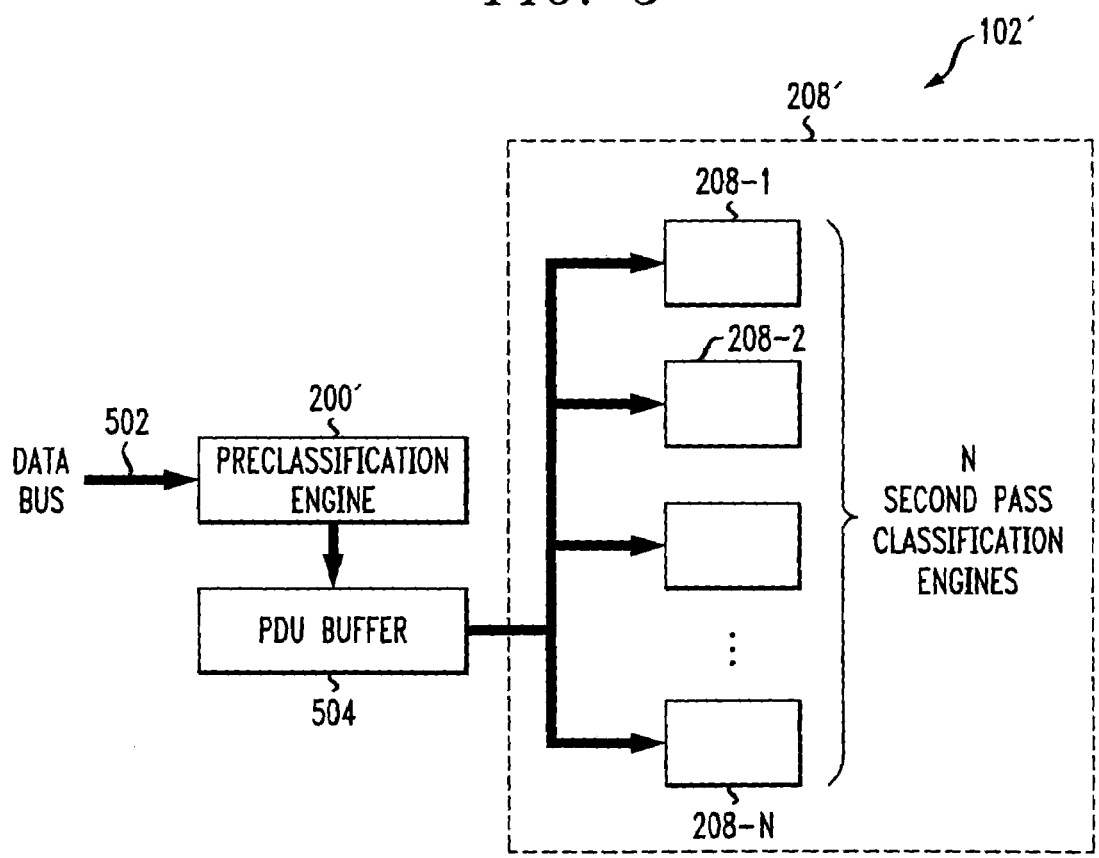
FIG. 5 shows another illustrative embodiment of the network processor of the FIG. 1 system configured in accordance with the techniques of the invention.

FIG. 5 shows another illustrative embodiment of a network processor 102' suitable for use in the FIG. 1 system. In this embodiment, the network processor 102' includes a first pass classifier in the form of a preclassification engine 200' and a second pass classifier 208' in the form of N second pass classification engines arranged in parallel as shown. The preclassification engine 200' receives packet data from the network 108 or switch fabric 110 of FIG. 1 via a data bus 502, and interfaces with memory circuitry in the form of a protocol data unit (PDU) buffer 504. A PDU in this embodiment corresponds generally to a packet. The PDU buffer 504 is also accessible to the N second pass classification engines of the second pass classifier 208'. The PDU buffer 504 corresponds generally to the memory 204 of the FIG. 2 embodiment.

In accordance with the invention, the preclassification engine 200' can be configured to perform a first pass classification to generate information which is passed to the classification engines of the second pass classifier 208' via a tag or other specified data structure, so as to reduce the time required to perform the second pass classification.

The first pass classification can be implemented on portions of a packet, e.g., on a cell basis, where each cell comprises a portion of a packet. Such an arrangement allows packet data statistics to be collected on a cell basis rather than a complete packet basis, which may be important in certain implementations.

As indicated previously, it is also possible to prioritize the packets in accordance with a desired prioritization for scheduling of second pass classification.

The preclassification engine 200' may also be configured to determine portions of cells, packets or other packet data that need not be stored in internal network processor memory, so as to reduce the memory requirements of the PDU buffer 504.

The above-described embodiments of the invention are intended to be illustrative only. For example, although the illustrative embodiment utilizes separate first pass and second pass classifiers, other embodiments may combine the functionality of these elements into a single classification engine, set of classification engines or other type of classification circuitry. In addition, although the memories 204 and 504 are illustratively internal to the network processor in the embodiments described above, this is by way of example only. Other embodiments can use different types of internal or external memory configurations for implementing the described functionality. Furthermore, the particular portions of a given set of packets to be stored in an internal buffer memory can be varied depending upon the processing application, e.g., under software control via a host processor. These and numerous other alternative embodiments within the scope of the following claims will be apparent to those skilled in the art.

What is claimed is:

1. A processor comprising:
    classification circuitry; and
    memory circuitry coupled to the classification circuitry and being configurable to store at least a portion of at least a given one of a plurality of packets to be processed by the classification circuitry;
    wherein the classification circuitry is configurable to implement a non-sequential packet classification process for at least a subset of the plurality of packets including the given packet, the non-sequential packet classification process being configurable to cause the processor to skip back to a particular non-initial bit of the given packet at a time during the classification process after which the particular non-initial bit has been processed, such that multiple passes of the classification process can be performed on the given packet.

2. The processor of claim 1 wherein the given packet is generated in accordance with multiple embedded protocols, and the non-sequential packet classification process allows the processor to return from a given point within the packet at which a final one of the protocols is identified to a beginning of the packet.

3. The processor of claim 2 wherein the given point within the packet comprises a point at which a Transmission Control Protocol (TCP) destination is identified.

4. The processor of claim 1 wherein the non-sequential packet classification process is implementable without loss of any portion of the packet.

5. The processor of claim 1 wherein the non-sequential packet classification process is further configurable to execute at least one skip to beginning instruction that causes the processor to skip back to an initial bit of the given packet.

6. The processor of claim 5 wherein the skip to beginning instruction is executable in the processor under the control of an external host device operatively coupled to the processor.

7. The processor of claim 1 wherein the processor is configurable to provide an interface between a network from which the packets are received and a switch fabric.

8. The processor of claim 1 wherein the memory circuitry comprises an internal memory of the processor configurable to store a designated portion of the given packet and an external memory coupled to the processor and configurable to store substantially the entire given packet.

9. The processor of claim 1 wherein the classification circuitry comprises at least a first pass classifier and a second pass classifier, the non-sequential packet classification process being implementable in at least the second pass classifier.

10. The processor of claim 9 wherein the first pass classification comprises at least one of a reassembly operation, a parity check and a priority determination.

11. The processor of claim 9 wherein the first pass classification generates information which is passed in a specified data structure to the second pass classifier for use in the non-sequential packet classification process.

12. The processor of claim 1 wherein the processor comprises a network processor.

13. The processor of claim 1 wherein the processor is configured as an integrated circuit.

14. A method for use in a processor comprising classification circuitry and memory circuitry coupled to the classification circuitry, the method comprising the steps of:
    storing in the memory circuitry at least a portion of at least a given one of a plurality of packets to be processed by the packet classification circuitry; and
    configuring the packet classification circuitry to implement a non-sequential packet classification process for at least a subset of the plurality of packets including the given packet;
    wherein the non-sequential packet classification process is configurable to cause the processor to skip back to a particular non-initial bit of the given packet at a time during the classification process after which the particular non-initial bit has been processed, such that multiple passes of the classification process can be performed on the given packet.

15. The method of claim 14 wherein the given packet is generated in accordance with multiple embedded protocols, and the non-sequential packet classification process allows the processor to return from a given point within the packet at which a final one of the protocols is identified to a beginning of the packet.

16. The method of claim 14 wherein the non-sequential packet classification process is implementable without loss of any portion of the packet.

17. The method of claim 14 wherein the non-sequential packet classification process is further configurable to execute at least one skip to beginning instruction that causes the processor to skip back to an initial bit of the given packet.

18. The method of claim 14 wherein the classification circuitry comprises at least a first pass classifier and a second pass classifier, the non-sequential packet classification process being implementable in at least the second pass classifier.

* * * * *